Patented June 30, 1936

2,045,782

UNITED STATES PATENT OFFICE 2,045,782

FOOD PRODUCT AND METHOD OF MAKING THE SAME

William P. Kesel, Valley Stream, N. Y.

No Drawing. Application July 30, 1931,
Serial No. 554,077

3 Claims. (Cl. 99—11)

The object of my invention is to provide a new and novel food product having high nutritive value and which is also very palatable and which will encourage the consumption of those ingredients which are beneficial not only from a nutritive standpoint but also from a digestive standpoint. The main feature of the products forming the subject of this application is the combining of food ingredients in butter so that the combined product may be eaten and used in the same manner as plain table butter, the ingredients other than butter being in such proportion that they will enhance the flavor of the butter without entirely dominating the flavor.

For this reason the ingredients other than butter will not ordinarily be more than twenty percent by weight of the combined product and preferably it will run between five and ten per cent by weight. While, broadly, any food ingredient, such as fresh eggs, fruit juices, brans and other cereals may be mixed with the butter to form the combination product, it is very desirable to combine with the butter malt, either in dry or liquid form. The malt will rather enhance the flavor of the product but it is used principally to introduce diastetic enzymes. This will stimulate digestion of the starchy foods on which butter is usually applied, and will also serve as a digestive element for the butter itself.

My invention resides in the combination, broadly, of any food ingredient or ingredients, with butter, wherein the butter content forms a major portion of the product; and more specifically the invention resides in the combination of malt with butter either with or without other food ingredients.

In addition to the product my invention relates to the method of making it as herein described; and the object of the method is to so combine the various food ingredients that the final product will have a smooth texture and one which may be readily spread the same as table butter, and which will as nearly as possible resemble ordinary table butter. In addition, the ingredients other than butter will be and remain evenly distributed throughout the body of the product.

I will first describe the method of making the product with malt combined with the butter. The first step is to mix with a quantity of cream or milk a quantity of malt which latter may be either in the dry or powdered form, or in liquid form. This is done by mixing the malt with the liquid milk or cream and stirring them together to completely distribute the malt in the milk or cream. The quantity of malt so mixed with the liquid milk or cream will generally range between five and ten per cent of the total weight of the combined mixture and in any event it should not exceed twenty per cent of the total weight in order to have the flavor of the butter at least discernible if not prevailing; and in order to obtain a finished product which will have physical characteristics closely resembling plain butter. After the malt and milk or cream have been thoroughly mixed, the combined liquid is then churned if the product is to conform to sweet butter, by subjecting the mixture to the ordinary churning operation as is generally carried out for making plain butter. If desired, the mixture of milk or cream and malt may be ripened by the application of lactic culture and salt may be added and the mixture may then be churned in the same manner as cream is ordinarily churned to produce butter.

When the churning operation has been completed there will be two products resulting from the operation, one of which is a solid mass corresponding in texture with ordinary butter and containing the butter fats and the malt. This product may be spread upon bread or other food, or it may be used in cooking and in fact, in all the ways in which ordinary butter is consumed. It has a very pleasing taste, different from any product heretofore made. The taste is especially attractive to children and encourages not only the use of butter fats, but at the same time the consumption of the malt content which is an aid to digestion and assimilation because of the diastetic enzymes in the malt, and it is also a food. It is also particularly desirable as a digestive of the starchy content of bread, potatoes and other foods to which butter is ordinarily applied. The consumer is therefore not only able to satisfy the taste and consume the necessary quantities of butter fats, but at the same time supply the desirable digestive properties to the food by the most satisfactory method, i. e., directly mixed with the food so that it acts upon and with it from the beginning to the end of the digestive action.

As a by-product in the making of the food product just described, there is also produced, as a result of the churning operation, a liquid food product in the form of buttermilk having a portion of the malt combined with it and this by-product may be consumed in the place of ordinary or plain buttermilk. It also has a high food value as well as a high value as a diathetic. This by-product, being in liquid form, will be consumed as a liquid and because of its attractive flavor children who ordinarily are disinclined to drink sufficient quantities of plain or buttermilk may be encouraged to drink the malt-buttermilk by-product, so that children deficient in nutrition and digestive functioning may be improved in health and vigor.

The combination of the malt with the milk or cream in liquid state before being churned, brings about a complete combination of the malt content and butter fat so that the finished product has the malt equally distributed throughout the product and the texture of the combined product is smooth.

As stated above, under the broad combination of my invention other food ingredients may be combined with the butter content for the purpose of adding to the diet those ingredients which are necessary or desirable for the treatment of persons deficient in particular food materials. For instance, fresh eggs may be mixed with the liquid milk or cream, either with or without, but preferably with, malt. In this case the eggs are broken into the liquid cream or milk (to which the malt may be added) and thoroughly stirred into the same and then the mixture is churned as described above. In this case the solid product resulting from the churning operation will contain not only butter fats and a portion of the malt but in addition the food value of the eggs. The flavor of the eggs will not predominate in the finished product, nor will the malt predominate to an extent which will eliminate the butter flavor.

In like manner fresh fruit juices, either with or without the malt, may be mixed with the milk or cream in the liquid state and the whole may be churned as described above. In this case the finished product will contain not only the butter fats and the malt, where the latter is used, but it will also contain the fruit juices which may be desirable in the diet of persons deficient in the same. Likewise bran and other cereals may be mixed with the liquid milk or cream and the whole may be churned to produce a product having a desirable percentage of roughage and one which will supply mineral salts in the diet where this may be desirable.

It will be apparent from the above that I provide a food product which will encourage the introduction into the diet of those ingredients which are necessary and desirable for nutritive as well as digestive properties. Furthermore, the product is more pleasing to the taste and therefore attractive, so that a proper dietary balance for any particular class of persons may be encouraged and regularly introduced without the opposition ordinarily met with when the ingredients are taken in the form of tonics or medicines.

Having described my invention, what I claim is:

1. A method of making a combined food product, the major portion of which consists of butter fat, said method consisting in mixing a digestive or nutritive ingredient or ingredients other than butter fats with milk or cream in the liquid state and then churning the mixture to form a solid product having a texture simulating that of butter.

2. A method of making a combination food product, the major portion of which consists of butter fats, said method consisting of mixing malt with milk or cream in the liquid state and then churning the mixture to form a solid product having a texture simulating that of plain butter.

3. A method of making a combined edible product consisting of mixing egg with milk or cream in the liquid state and churning the mixture to produce a solid mass substantially the consistency of plain butter, the combined product having a major butter fat content.

WILLIAM P. KESEL.